Sept. 2, 1969        B. EDWARDS        3,465,071
REDUCED NECK ARTICLE FORMING METHOD AND APPARATUS
Filed June 8, 1966        2 Sheets-Sheet 1
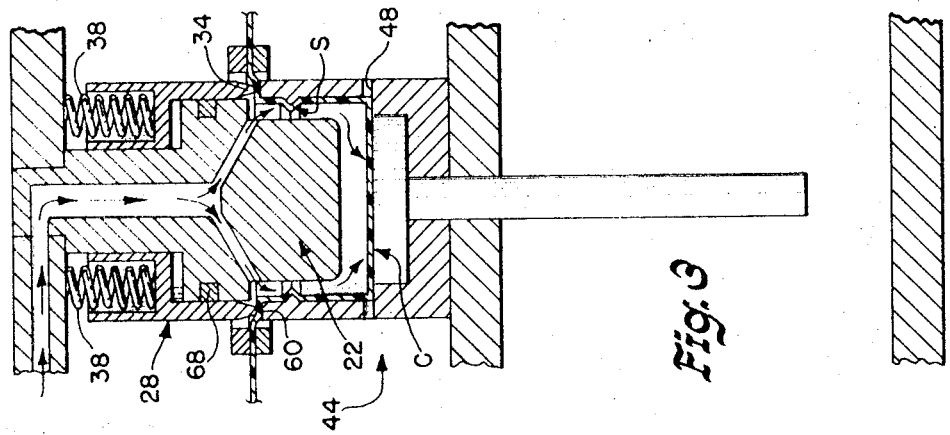
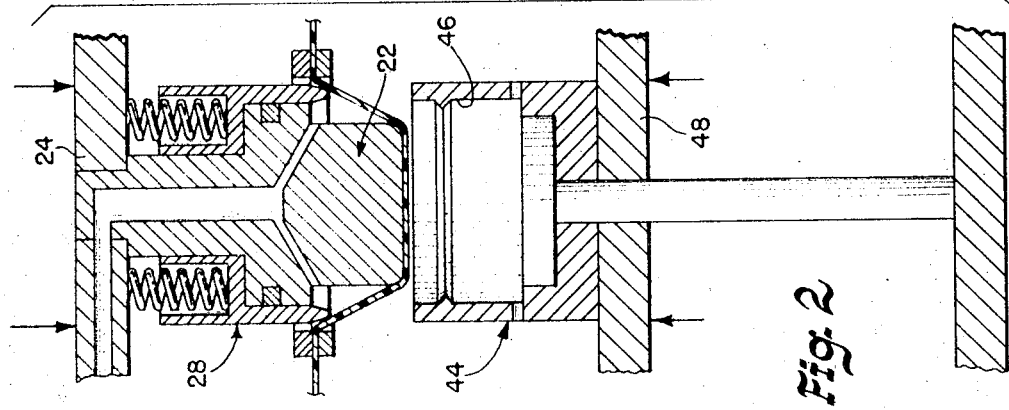
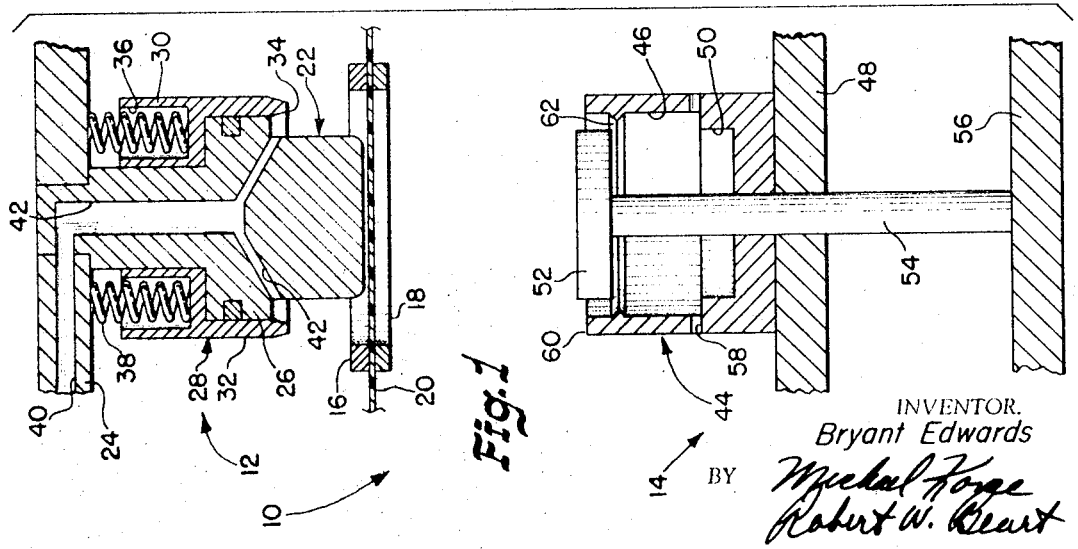
INVENTOR.
Bryant Edwards
BY
His Att'ys Sept. 2, 1969  B. EDWARDS  3,465,071
REDUCED NECK ARTICLE FORMING METHOD AND APPARATUS
Filed June 8, 1966  2 Sheets-Sheet 2
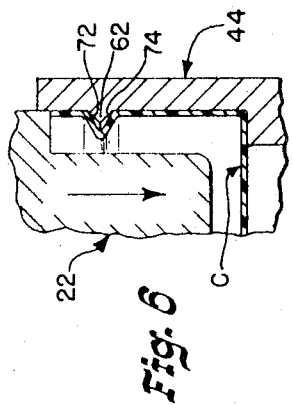
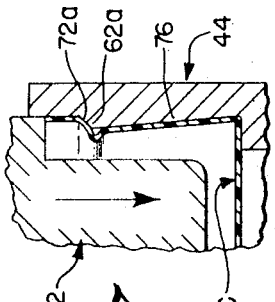
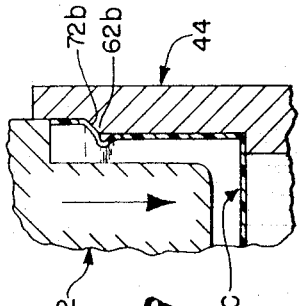
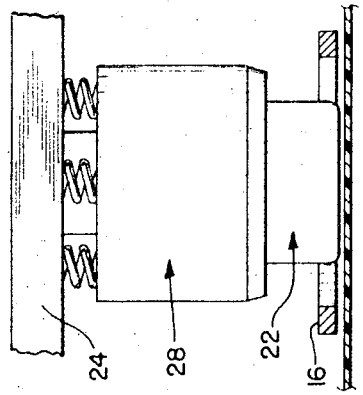
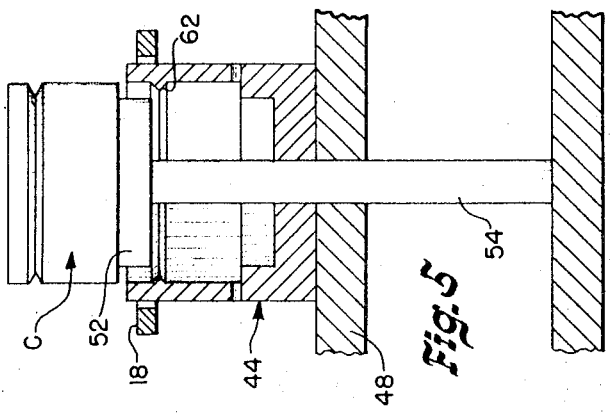
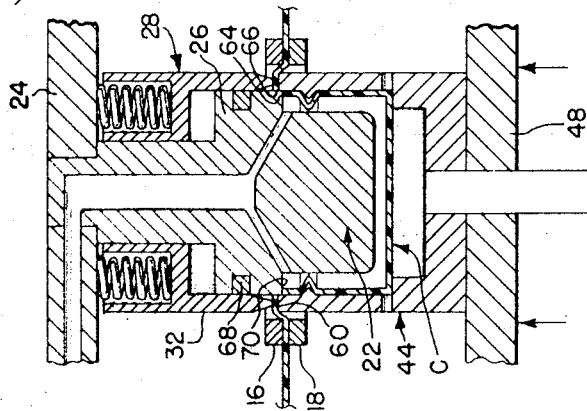
INVENTOR.
Bryant Edwards
BY
His Att'ys

United States Patent Office 3,465,071
Patented Sept. 2, 1969

3,465,071
REDUCED NECK ARTICLE FORMING METHOD AND APPARATUS
Bryant Edwards, Clarendon Hills, Ill., assignor to Illinois Tool Works Inc., Chicago, Ill., a corporation of Delaware
Filed June 8, 1966, Ser. No. 556,088
Int. Cl. B29g 1/00; B29d 31/00; B29c 17/08
U.S. Cl. 264—93                              10 Claims

ABSTRACT OF THE DISCLOSURE

A method and apparatus for fabricating an openmouthed container article with restricted throat area from thermoplastic sheet stock material by forming an openmouthed article with an inwardly directed shoulder therein, severing the openmouthed container article from the material portions from which the article is formed and then moving portions on opposite sides of the inwardly directed shoulder toward each other and also inwardly of the container to provide a restricted throat area of substantial size in the container.

---

The present invention is specifically related to sheet forming molding techniques, commonly known as "thermoforming" whereby a heated web of thermoplastic sheet stock material is formed through the use of mechanical and/or fluid pressure into a desired article configuration. In the past, the fabrication of hollow thermoplastic articles with restricted throat areas has principally been accomplished through the use of split or expanding mold parts. Accurate control of the manufacturing sequence over prolonged periods has been difficult due to the wearing and consequent inefficiency of mold parts, and the molding cycle time has been restricted by the lateral or transverse movement of the split or expanding mold parts in forming the reduced neck or restricted throat area. Split or expanding mold parts necessitate a seamed construction in the ultimately formed article which is not only unsightly, but provides a rough surface which may create unsanitary conditions when the article is used as a food or drink container.

Accordingly, it is an object of the present invention to provide a method and apparatus for fabricating hollow thermoplastic articles with reduced necks or restricted throat areas which overcome the above noted deficiencies.

More particularly, it is an object of the present invention to provide a method and apparatus for the single operation molding of a seamless, one-piece thermoplastic article with a restricted throat or reduced neck area.

Another object of the present invention is the provision of a method and apparatus which, in addition to the aforementioned objects, employs all of the advantages inherent in thermoforming techniques including economy, speed and efficiency of operation.

Yet another object of the present invention is the provision of a method and apparatus which forms articles of the type aforenoted without laterally moving parts, such as split mold or expanding pallets, so as to avoid consequent wear and adjustment problems in the molding apparatus.

These and other objects and advantages are obtained by forming an open mouth article with an inwardly directed shoulder from a heated web of thermoplastic material, moving portions of the container on opposite sides of the inwardly directed shoulder relatively toward each other and also inwardly of the container article to enlarge the inwardly directed shoulder to provide a restricted throat area of substantial size in the container article, and severing the open mouth container article from the surrounding material portions of the heated web of thermoplastic material to form the ultimate container article.

Reference is now made to the drawings wherein:

FIG. 1 is a fragmentary sectional view showing the important parts of the molding apparatus in accordance with the teachings of the present invention;

FIG. 2 is a view similar to FIG. 1 showing the relative approaching movement of the mold members and the mechanical pre-stretching of a predetermined area of thermoplastic sheet stock material by one of the mold members;

FIG. 3 is a view similar to FIGS. 1–2 at a further stage of the forming cycle depicting the use of fluid pressure in the forming of the desired container article;

FIG. 4 is a view similar to FIGS. 1–3 illustrating the formation of the restricted throat area or reduced neck portion of the desired container article and the severance of the container article from the web of thermoplastic sheet stock material;

FIG. 5 is a fragmentary side elevational view, partly in section, depicting the ejection or removal of the container article from the mold members;

FIG. 6 is an enlarged fragmentary sectional view showing the manner in which the restricted throat area or reduced neck portion is formed in a hollow container article according to the teachings of the present invention; and FIGS. 7–8 are enlarged fragmentary sectional views similar to FIG. 6, but showing various modifications that can be made in the mold member to achieve the desired restricted throat area or reduced neck portion.

The method and apparatus of the present invention is designed to form one-piece, seamless, thermoplastic hollow container bodies or articles with an enlarged restricted throat area or reduced neck portions without the difficulties inherent in the prior art methods and apparatus previously mentioned. The size and shape of the container articles may vary to meet the particulars required, it being understood that for the purposes of the present discussion any type of hollow container article where a restricted area or reduced neck portion is desired is to be contemplated as coming within the purview of the present invention.

Referring now to the drawings, and first to FIG. 1, there will be seen an apparatus generally designated 10 including upper mold means 12, lower mold means 14, and a pair of annular clamp members 16, 18 on opposite sides of a web of thermoplastic sheet stock material, such as polystyrene or any other suitable thermoplastic material. The thermoplastic web 20 is initially extruded into the sheet form shown, and intermittently set past a heating station (not shown) where it is heated to its forming temperature. The thermoplastic web is then fed to a forming station, where one or more cooperating male and female mold members are employed, such as is generally designated by the numeral 10.

When the thermoplastic web reaches the forming station, the upper and lower annular clamp rings 16, 18, which are supported by upper and lower clamping mechanisms (not shown) of conventional form as shown for example in U.S. Patent No. 2,962,758, are moved relatively toward each other to clamp a predetermined area of the thermoplastic web 20 to enable the material therewithin to be formed into an article as will presently be described. The mechanisms for advancing and retracting the clamping rings 16, 18, as well as the upper and lower mold means, are well known in the art, and may comprise, for example, hydraulic mechanisms, cam mechanisms, and the like.

The upper mold means 12 comprises a male plunger or mandrel 22 which is supported by the upper frame or manifold 24 above the clamped area of the thermoplastic web. The mandrel 22 includes a radially outwardly enlarged portion 26 upon which a sleeve 28 rests. The sleeve 28 includes a first upper portion 30 which overlies and abuts the radially enlarged shoulder 26 of the mandrel and an annular depending skirt portion 32 which surrounds the shoulder portion 26. The lower end 34 of the depending skirt portion cooperates with the portions of the lower mold means 14 as will be discussed hereafter.

The upper portion 30 of the sleeve 28 is provided with a series openings 36 at circumferentially spaced positions, each of which accommodate or accept helical coil spring means 38 as shown. One end of each helical coil means 38 abuts the lower face of the frame or manifold 24 while the other end engages the bottom wall of the opening 36 in which it is positioned to spring load the sleeve 28 away from the frame or manifold 24 and into engagement with the enlarged shoulder 26 of the mandrel 22 as illustrated in FIG. 1 of the drawings.

It will be noted that the mandrel 22 and the frame 24 have cooperating passageways to permit a suitable source of air pressure (not shown) to pass air therethrough. More particularly, the frame 24 includes a passageway 40 which is connected to the suitable source of air pressure and communicates with the channel 42 formed in the upper portions of the mandrel 22, the latter in turn communicating with a plurality of radially outwardly directed ports 42 which extend through the outer wall or periphery of the mandrel 22 as shown.

The forming station 10 also includes the lower mold means 14 in the form of a female mold 44 having a cavity 46 provided therein into which the mandrel or plug 22 is moved as will subsequently be described. The female mold 44 is suitably supported by its lower platten or frame 48 which, in turn, is connected to suitable advancing and retracting mechanisms as are well known in the art.

The cavity 46 of the female mold includes a recessed bottom area 50 for receiving a knock-out plunger or ejector mechanism 52 as shown in FIGS. 2–4 of the drawings. The knock-out plunger or ejecting mechanism 52, which serves for the most part during the molding process as the bottom of the cavity 46, is connected by a stem or connecting rod 54 to the knock-out advancing mechanism 56 which, like the other advancing and retracting mechanisms for moving the upper and lower frames or plattens 24, 48 respectively may comprise a cam mechanism, hydraulic mechanism, or other such equivalent structure.

The female mold 48 further includes a series of bleed ports 58 which become useful in the manufacturing process to evacuate air trapped between the plastic material and inner wall periphery of the female mold 44. Adjacent the upper end 60 of the female mold 44 is a radially inwardly directed circumferential projection 62 which is radially inwardly offset from the inner wall periphery of the female mold. The circumferentially extending mold projection means 62 may take various form, including peripheral interruptions and the like, and this will be subsequently discussed.

The first step in the forming cycle is the clamping of a predetermined area of the thermoplastic web 20 by the upper and lower clamp rings 16, 18 after the thermoplastic web has been heated and indexed into position between the upper and lower mold means 12, 14. This first stage or beginning step of the forming cycle is depicted in FIG. 1 of the drawings. Once this has been accomplished, the deformation of the web by either mechanical or fluid pressure or a combination of both may be employed to form the ultimate shape desired. While the present invention deals with the plug assist technique employing a combination of mechanical engagement and fluid pressure deformation, it will be recognized that various other molding techniques such as have been specified may be employed to provide the final article configuration.

The actual forming of the thermoplastic web 20 begins with the relative advancement of the upper and lower frames or platten, 24, 48 respectively. The frames will carry with them their attached molding members to effect the drawing of the thermoplastic web. The mandrel 22, because of its close position with respect to the thermoplastic web 20, will engage the material within the predetermined clamped area drawing it downwardly as best seen in FIG. 2 of the drawings. While the mandrel or plunger 22 is drawing the thermoplastic web in the fashion illustrated in FIG. 2, the female mold element 42 is advanced upwardly so as to position the drawn material areas of the thermoplastic web 20 into the cavity 46 of the female mold. When the mandrel 22 and the female mold 44 have completed their relative advancing movement toward each other, they will assume the position shown in FIG. 3 of the drawings. In this position, the lower face 34 of the spring loaded sleeve 28 will cooperate with the upper end 60 of the female mold element in further clamping and sealing off the drawn material areas of the web from the surrounding material portions.

By sealing off the mechanically pre-stretched areas of the clamped sheet from the remainder of the thermoplastic web, air under pressure can then be introduced through the communicating passageway 40, the channel 42 of the mandrel and thence through the radially extending ports 42 thereof to expand the pre-drawn areas against and into conformity with the inner wall periphery of the female mold elements. The bleed ports 58 aid in evacuating air trapped between the inner wall periphery of the female mold and the drawn areas of the thermoplastic web. As a result, the formed article will conform completely to the inner wall periphery of the female mold element. This will include the formation of a radially inwardly directed shoulder S in the container C as readily depicted in FIG. 3 of the drawings.

While the mandrel or plunger 22 is preferably made of heat insulatable materials such as disclosed in my prior Patent 3,172,159, the female mold element is preferably chilled to enhance the setting of the plastic material. It is important, however, that certain additional steps be performed in the forming cycle prior to the complete setting of the plastic material.

In accordance with the teachings of the present invention, the mandrel 22 is moved downwardly, as shown in FIG. 4 of the drawings, and while the air pressure is still on, to sever the article previously formed adjacent its sealed-clamped area, thereby enabling the formation of an enlarged restricted throat area or reduced neck section in the container C. This is accomplished by moving portions of the container sidewall on opposite sides of the radially inwardly directed shoulder S relatively toward each other and also inwardly of the container C so as to enlarge the shoulder S which is formed as the drawn thermoplastic material conforms to the mold projection means 62 formed on the inner wall of the mold cavity 46.

While the shoulder S initially formed in the container C may be enlarged by various means incorporated within the mold structures, it has been found that an expeditious way of accomplishing this is to sever the formed container C from the surrounding web portions adjacent its open mouth, and axially compressing the severed free end of the container C to cause sidewall portions of the container on opposite sides of the shoulder S to be moved toward each other and also inwardly of the container sidewall creating the enlarged restricted throat area or reduced neck section in the container.

This expeditious approach is readily depicted in FIG. 4 of the drawings. The radially outwardly enlarged portion 26 of the mandrel 22 includes a cutting edge 64 which cooperates with the sharp corner cutting edge 66 at the juncture of the upper end 60 of the female mold 44 and the internal wall thereof to sever the container C from the surrounding web portion within the clamped area thereof. The spring loaded sleeve 28 yields upon advancement of the female mold 44, as indicated by the arrows in FIG. 4 of the drawings, causing the cutting edges 64, 66 of the mandrel and female mold respectively to cooperate with one another in causing the severance of the container from the surrounding web portions. The lower face 34 of the spring loaded sleeve 28 and the upper face 60 of the female mold 44 engage in clamping the material interiorly of the clamped rings 16, 18 to facilitate the severance of the container from the surrounding web material. The outer periphery of the radially enlarged shoulder 26 includes a recess for receiving an O-ring 68 which acts as a sealing member between the mandrel 22 and sleeve 28 during relative movement therebetween from the position shown in FIG. 3 to that in FIG. 4.

It will, of course, be understood that in lieu of advancing the female mold 44, the mandrel 22 may be advanced to bring the cooperating cutting edges 64, 66 adjacent one another, the spring loaded sleeve 28 yielding in the same manner as would occur with the advancement of the female mold 44.

When the container C is severed from the thermoplastic web as shown in FIG. 4, the lower face 70 of the radially enlarged shoulder 26 will compress the severed free end of the container in an axial direction, thereby causing the material on opposite sides of the initially formed shoulder S in the container to be moved toward each other and also inwardly of the container outer wall as shown in FIG. 4 to form the enlarged restricted throat or reduced neck section in the container. This must be accomplished prior to complete setting of the thermoplastic material so that the enlarged restricted throat area will include material from opposite sides of the initially formed shoulder S and thereby avoid excessive thinning of the container at this location.

The formed container is now ready to be removed from the forming station 10, and this may be achieved by causing relative separating movement of the mandrel 22 and female mold 44 as shown in FIG. 5 of the drawings by operation of the various retracting mechanisms associated with these respective elements. Moving the female mold 44 downwardly away from the plastic web will cause the stem 54 of the knock-out plunger 52 to engage the platen mechanism 56, which preferably is fixed relative to the other moving mold parts, causing stripping of the container C from the female mold 44. Due to the enlargement of the restricted throat area or reduced neck section in the container according to the above mentioned techniques, this part of the container can be easily moved past the inwardly formed mold projection 62 formed on the female mold. In any event, the inherent flexibility of the thermoplastic material from which the container is formed enables slight resilient contraction of the container as it passes the shoulder 62 facilitating separation of the container from the female mold. When the container is located in the position shown in FIG. 5 of the drawings, an air jet (not shown) or other suitable product removable mechanism may be employed to remove the container from the forming station. This completes the forming cycle, and the above mentioned steps are now repeated to form a second container and so on as desired.

Various types of mold projection means may be provided on the internal wall of the female mold 44. In FIG. 6 of the drawings, the mold projection means 62, as illustrated in FIGS. 1–5 of the drawings, is shown on an enlarged scale, and upon inspection it will be apparent that it comprises upper and lower sloping faces 72, 74 which intersect at a point radially inwardly of the female mold inner wall to define a V-shaped projection on the inner wall of the female mold 44. In FIG. 7 of the drawings, the mold projection 62a includes an upper sloping face 72a corresponding to the upper sloping face 72 of the mold projection 62; however, there is no corresponding lower sloping face. Rather, the inner wall of the female mold slopes upward and inwardly from the bottom wall as at 76 to provide an upwardly and inwardly sloping sidewall in the formed container as illustrated. During the formation of the enlarged restricted throat area or reduced neck section, the material will initially conform to the mold projection 62a, and upon severance and axial compression of the container sidewall, the initially formed shoulder S will be enlarged in the same manner as the FIGS. 1–6 embodiment. It will be apparent that the ultimately formed enlarged restricted throat area or reduced neck section will take a slightly different form due to the absence of the lower sloping face 74 in the FIG. 7 embodiment.

Another embodiment is shown in FIG. 8 of the drawings, and in this particular instance, it will be seen that the mold projection means 62b, while including an upper sloping face 72b, has no undercut whasoever. There is no sloping sidewall as in the FIG. 7 embodiment, and this will change the inner container projection only slightly. As can be seen, the form of the restricted throat area or reduced neck section in the container C shown in FIG. 8 of the drawings, is not materially different from that shown in FIG. 7, thus indicating that various forms of restricted throats or reduced neck sections may be used in combination with the vertical or tapering sidewalls as may be desired.

The various mold projection means shown in FIGS. 6–8 of the drawings are to be considered as exemplary forms only as it will be readily understood that various shapes and designs, continuous or discontinuous, may be employed as desired.

From the foregoing it will now be appreciated that the present invention contemplates a novel and unique method and apparatus for achieving an enlarged restricted throat area or reduced neck section in a seamless thermoplastic container body without the necessity for split mold parts

I claim:

1. The method of forming a container with a restricted throat area comprising the steps of heating a web of thermoplastic sheet stock material to its forming temperature, forming an openmouthed article with an inwardly directed shoulder from the heated web of thermoplastic material, moving portions of the container on opposite sides of the inwardly directed shoulder relatively toward each other and also inwardly of the container article to enlarge the inwardly directed shoulder and thereby provide a restricted throat area of substantial size in said container article, and severing the openmouthed container article from the surrounding material portions of the heated web of thermoplastic material prior to moving portions of the container on opposite sides of the inwardly directed shoulder relatively toward each other and inwardly of the container to form the ultimate container article.

2. The method as set forth in claim 1 wherein the forming of the openmouthed container article is accomplished by a combination of mechanical drawing and differential fluid pressure.

3. The method as defined in claim 2 wherein the forming of the enlarged restricted throat area is accomplished while differential fluid pressure maintains the formed container against a mold element which forms the container article.

4. Apparatus for the production of a container with a restricted throat element comprising, means for heating a web of thermoplastic sheet stock material to its forming temperature, means for forming an openmouthed container article with an inwardly directed shoulder from the heated web of thermoplastic material, means for severing the openmouthed container article from the surrounding material portions of the heated thermoplastic web, and means including said severing means for thereafter moving portions of the container article on opposite sides of the inwardly directed shoulder relatively toward each other and also inwardly of the container to enlarge the inwardly directed shoulder and thereby provide a restricted throat element of substantial size in said container.

5. The apparatus as defined in claim 4 wherein the means for forming the openmouthed container article comprises first and second relatively movable mold members disposed on opposite sides of the thermoplastic web, means for actuating said first and second mold member to initially pre-draw a predetermined area of the web, means for sealing off the predetermined drawn areas of the web from the remainder thereof, and means for establishing a pressure differential across the sealed area to expand the pre-dawn portions of the web against one of the mold members to complete the formation of the container article.

6. The apparatus as defined in claim 4 wherein the means for forming the openmouthed container article includes the establishment of a differential pressure, and said means for moving portions of the container on opposite sides of the inwardly directed shoulder relatively toward each other and also inwardly of the container is operative while the pressure differential is maintained.

7. The apparatus as defined in claim 4 wherein said means for moving portions of the container on opposite sides of the inwardly directed shoulder comprises a mold element which first severs the container article from the web, and thereafter moves the severed free end generally in the direction of the container axis.

8. The apparatus as defined in claim 4 wherein means for moving portions of the container on opposite sides of the inwardly directed shoulder includes means for compressing the container in a direction aligned with its axis, and inwardly directed projection provided on a wall surface of a mold element for forming the inwardly directed shoulder on the container and against which portions of the container on opposite sides thereof are moved to create the enlarged restricted throat element.

9. The apparatus as set forth in claim 4 wherein the means for forming the container includes circumferentially extending mold projection means for molding a circumferentially arranged inwardly directed shoulder in said container.

10. The apparatus as set forth in claim 9 wherein the circumferentially extending mold projection means is peripherally disrupted to form spaced inwardly directed shoulders in said container.

References Cited

UNITED STATES PATENTS

| | | |
|---|---|---|
| 3,173,174 | 3/1965 | Edwards. |
| 3,342,915 | 9/1967 | Wanderer _____ 264—92 |
| 3,343,220 | 9/1967 | Martinek _____ 264—286 X |

ROBERT F. WHITE, Primary Examiner

T. J. CARVIS, Assistant Examiner

U.S. Cl. X.R.

18—19